United States Patent
Kim et al.

(10) Patent No.: US 10,348,452 B2
(45) Date of Patent: Jul. 9, 2019

(54) APPARATUS AND METHOD FOR TRANSMITTING VIDEO DATA IN COMMUNICATION SYSTEM

(71) Applicant: Samsung Electronics Co., Ltd., Suwon-si (KR)

(72) Inventors: Jae-Hyon Kim, Suwon-si (KR); Myung-Ha Kuh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 2 days.

(21) Appl. No.: 14/960,038

(22) Filed: Dec. 4, 2015

(65) Prior Publication Data

US 2016/0165169 A1 Jun. 9, 2016

(30) Foreign Application Priority Data

Dec. 4, 2014 (KR) ........................ 10-2014-0173049

(51) Int. Cl.
- *H04N 5/40* (2006.01)
- *H04L 1/00* (2006.01)
- *H04L 5/00* (2006.01)

(52) U.S. Cl.
CPC .............. *H04L 1/0083* (2013.01); *H04L 1/00* (2013.01); *H04L 1/0003* (2013.01); *H04L 1/0009* (2013.01); *H04L 1/0017* (2013.01); *H04L 5/0044* (2013.01)

(58) Field of Classification Search
CPC ......... H04N 5/40; H04N 5/455; H04L 1/0003
USPC ............. 348/724, 568, 387.1; 382/232, 233; 375/240.12, 240.25
See application file for complete search history.

(56) References Cited

U.S. PATENT DOCUMENTS

| | | | |
|---|---|---|---|
| 8,553,301 B2 * | 10/2013 | Tamura | H04N 1/644 358/518 |
| 2011/0058737 A1 | 3/2011 | Liu et al. | |
| 2011/0064133 A1 | 3/2011 | Park et al. | |
| 2011/0103472 A1 * | 5/2011 | Lefebvre | H04N 21/4122 375/240.12 |
| 2013/0279804 A1 | 10/2013 | Kilbank et al. | |
| 2013/0343668 A1 | 12/2013 | Li | |
| 2014/0036995 A1 | 2/2014 | Wang et al. | |

OTHER PUBLICATIONS

WirelessHD Specification v1.1 Overview, May 2010.
Wireless Gigabit Alliance, WiGig Display Extension Specification 1.1, Jun. 2013.
Wireless Gigabit Alliance, WiGig MAC and PHY Specification 1.3, Jun. 2013.

\* cited by examiner

*Primary Examiner* — Jefferey F Harold
*Assistant Examiner* — Jean W Desir
(74) *Attorney, Agent, or Firm* — The Farrell Law Firm, P.C.

(57) ABSTRACT

Video data transmission in a communication system is provided. A method for operating a transmitting node includes generating a packet comprising data selected from compressed data and raw data based on a data size, and transmitting the packet.

11 Claims, 17 Drawing Sheets

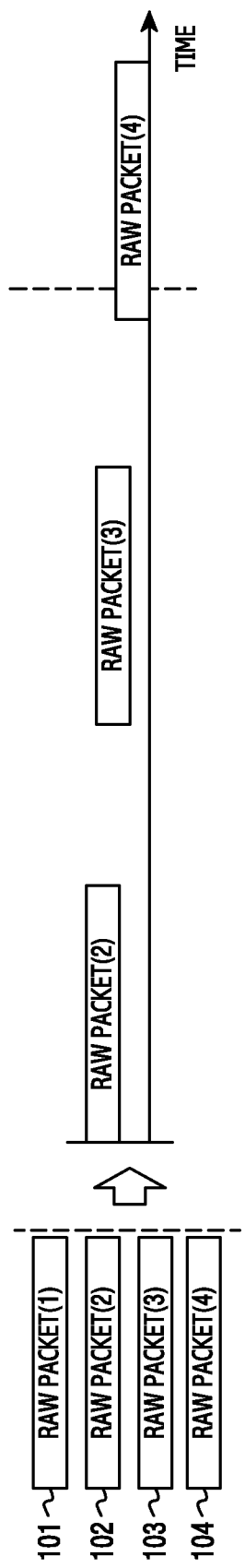
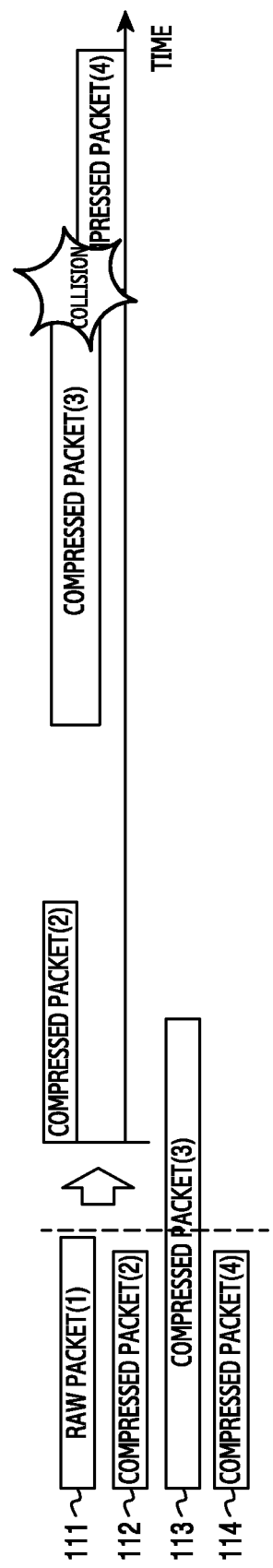
FIG. 1A
FIG. 1B

APPARATUS AND METHOD FOR TRANSMITTING VIDEO DATA IN COMMUNICATION SYSTEM

RELATED APPLICATION(S)

The present application claims the benefit under 35 U.S.C. § 119(a) to a Korean patent application filed in the Korean Intellectual Property Office on Dec. 4, 2014, and assigned Serial No. 10-2014-0173049, the entire disclosure of which is hereby incorporated by reference.

BACKGROUND

The present disclosure relates generally to video data transmission and reception in a system, and more particularly, to compressing data prior to transmission and decompressing received data.

Advances in communication technologies facilitate high-definition video transfer between devices over wired and wireless channels. For example, users in a cellular system can receive a real-time video streamlining service, or send video data to other devices via, for example, a Wireless Personal Area Network (WPAN) established in a limited area. Further, to satisfy users' rising expectations for quality of service, techniques for providing video data to the users without loss of quality to the original video data are being researched.

Generally, a wired network can transmit raw data without compression. By contrast, a wireless network generally compresses data due to its limited radio spectrum. The compression can be lossy compression or lossless compression. Typically, compression reduces video data in size. However, compression can sometimes lead to a larger data size due to characteristics of the original pixel values of the video data.

SUMMARY

The present disclosure provides an apparatus and a method for transmitting video data in a communication system.

Another aspect of the present disclosure is to provide an apparatus and a method for addressing data size increasing due to compression in a communication system.

Yet another aspect of the present disclosure is to provide an apparatus and a method for selectively compressing data in a communication system.

Still another aspect of the present disclosure is to provide an apparatus and a method for selecting a Modulation and Coding Scheme (MCS) level based on a data size in a communication system.

A further aspect of the present disclosure is to provide an apparatus and a method for indicating whether or not data of a packet is compressed in a communication system.

According to one aspect of the present disclosure, a method for operating a transmitting node in a communication system includes generating a packet comprising data from a smaller sized one of compressed data and raw data, and transmitting the packet.

According to another aspect of the present disclosure, a method for operating a receiving node in a communication system includes receiving a packet and processing the received data based on whether the received data is raw data or compressed data.

According to yet another aspect of the present disclosure, an apparatus of a transmitting node in a communication system includes a control unit for generating a packet comprising data from a smaller sized one of compressed data and raw data, and a transmitting unit for transmitting the packet.

According to still another aspect of the present disclosure, an apparatus of a receiving node in a communication system includes a receiving unit for receiving a packet comprising data from one of compressed data and raw data, and a control unit for processing the data based on whether the data is raw data or compressed data.

Other aspects, advantages, and salient features of the various embodiments of the disclosure will become apparent to those skilled in the art from the following detailed description and the accompanying drawings.

BRIEF DESCRIPTION OF THE DRAWINGS

The above and other aspects, features, and advantages of certain exemplary embodiments of the present disclosure will be more apparent from the following description taken in conjunction with the accompanying drawings, in which:

FIGS. 1A and 1B illustrate collision in a bus due to packet size increase in a communication system;

Throughout the drawings, like reference numerals will be understood to refer to like parts, components and structures.

DETAILED DESCRIPTION

Figure 2A:
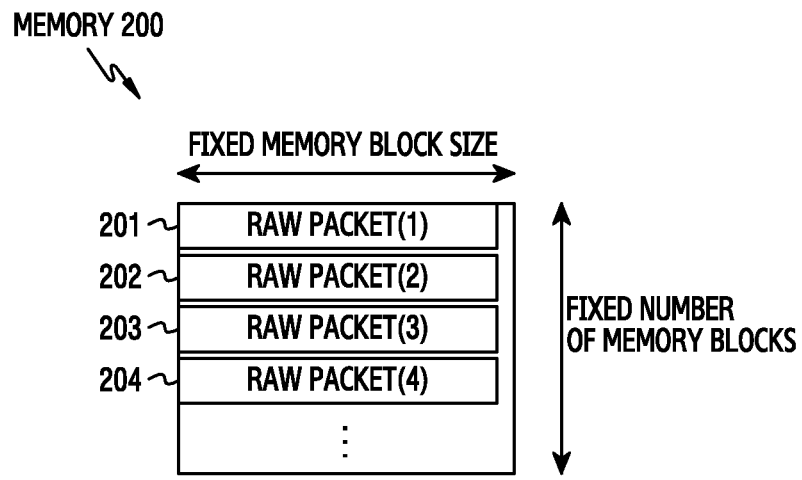
FIGS. 2A and 2B illustrate overflow in memory due to packet size increase in a communication system.

The following description with reference to the accompanying drawings is provided to assist in a comprehensive understanding of exemplary embodiments of the disclosure and those embodiments defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of exemplary embodiments of the present disclosure is provided for illustration purpose only and not to limit the various embodiments of the disclosure, including those defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for sending and receiving video data in a communication system. The video data can be transmitted for a streaming service, display on other device, and file transfer.

Hereinafter, a term for indicating a data type, a term for indicating an element in a packet, and a term for indicating a video data unit are illustrated to ease the understanding. Accordingly, the present disclosure is not limited to those terms mentioned, and can use other equivalent terms.

Terms such as '~ unit' and '~ er' represent a unit for processing at least one function or operation, and can be implemented using hardware, software, or a combination of hardware and software.

In video data transfer, compression can be used to reduce data size. However, in some cases, the compression can temporarily increase the data size. Possible effects of such data size increase are described in FIGS. 1 and 2.

FIGS. 1A and 1B illustrate collision in a bus due to packet size increase in a communication system. In FIG. 1A, raw packets 101 through 104 including raw data without compression are transmitted. In FIG. 1B, there is a raw packet 111 and compressed packets 112, 113, and 114 include compressed data. In FIGS. 1A and 1B, a number in parentheses denotes a packet transmission order.

Referring to FIG. 1A, the raw packets 101 through 104 are sequentially transmitted through the bus (not shown) based on time. The bus is a pathway for transferring the raw packets 101 through 104 from a packetizing module (not shown) to a transmitting module (not shown). A bus bandwidth may be designed to transfer packets of a predefined maximum size without collision. Advantageously, the predefined maximum size is greater than a raw packet size. Even when the raw packets 101 through 104 are output to the bus at preset intervals, the raw packets 101 through 104 can be transferred without collision.

Referring to FIG. 1B, a first raw packet 111, the first compressed packet 112, the second compressed packet 113, and a third compressed packet 114 are sequentially transferred through the bus. The first compressed packet 112 is reduced in size after the compression, whereas the second compressed packet 113 is increased in size after the compression. Theoretically, the compression can increase the size by a factor of two. In this case, when the packets 111 through 114 are output to the bus at preset intervals, the second compressed packet 113 and the third compressed packet 114 can collide with each other.

Figure 2B:
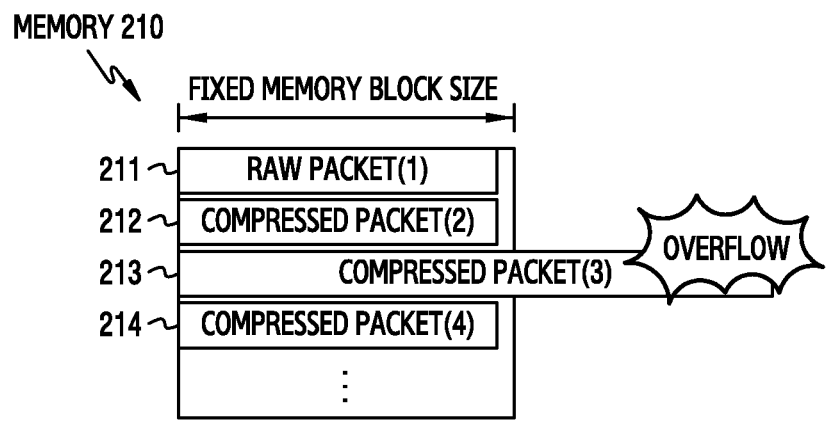

FIGS. 2A and 2B illustrate overflow in a memory due to packet size increase in a communication system. In FIG. 2A, raw packets 201 through 204 including raw data uncompressed are stored in memory 200. In FIG. 2B, packets 212, 213, and 214 include compressed data. In FIGS. 2A and 2B, a number in parentheses denotes a packet storage order.

Referring to FIG. 2A, the raw packets 201 through 204 are sequentially stored in the memory 200. The memory 200 can be a means for buffering the packets prior to the transmission over a channel. The memory 200 can include a fixed number of memory blocks, and each memory block can have a fixed memory block size. The memory block size is designed to store packets of a predefined maximum size without overflow. Advantageously, the predefined maximum size is greater than the raw packet size. In this case, the raw packets 201 through 204 can be stored without overflow.

Referring to FIG. 2B, a first raw packet 211, the first compressed packet 212, the second compressed packet 213, and a second raw packet 214 are sequentially transferred through the bus (not shown). The first compressed packet 212 is reduced in size after the compression, whereas the second compressed packet 213 is increased in size after the compression. Theoretically, the compression can increase the size up to twice. In this case, the second compressed packet 213 can cause an overflow in the memory.

As such, the compressed data that resulted in increase of the data size can thus cause memory overflow and bus collision. Furthermore, increase in data size as a result of a compression process degrades radio resource efficiency, contrary to the purpose of compression.

Figure 3:
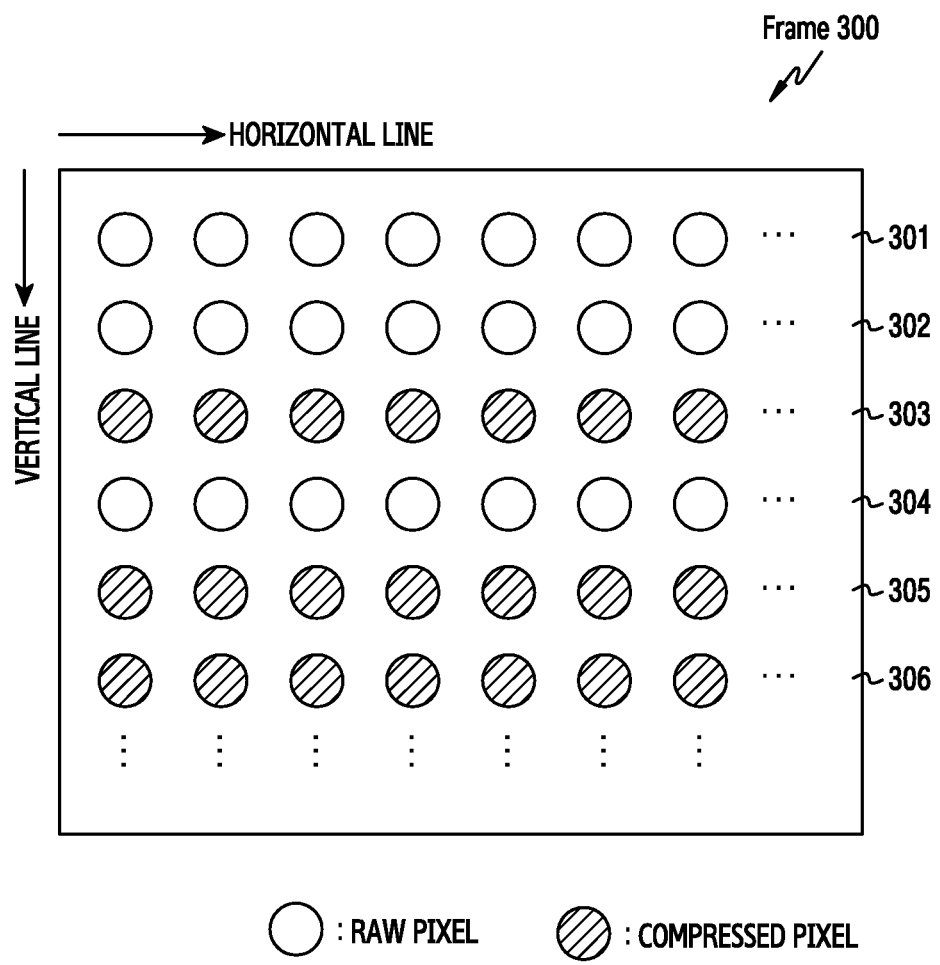
FIG. 3 illustrates selective compression of one frame in a communication system according to an exemplary embodiment of the present disclosure.

Hence, the present disclosure provides a method for determining whether to compress data and selectively compressing the data. The data compressed into a packet may be, for example, one line of pixels of a video frame 300 as shown in FIG. 3. The frame 300 may represent an individual still image from a video.

FIG. 3 illustrates selective compression of one frame in a communication system according to an exemplary embodiment of the present disclosure. Referring to FIG. 3, one frame includes a plurality of horizontal lines. In FIG. 3, a transmission data unit for a packet includes one horizontal line. After the selective compression, pixels of a first line 301, a second line 302, and a fourth line 304 are transmitted as raw data without compression, and pixels of a third line 303, a fifth line 305, and a sixth line 306 are transmitted as compressed data.

The compression can be fulfilled in various manners. The compression can be conducted based on a difference from a particular pixel (e.g., a pixel at the same location) value of a previous frame and a difference from a neighboring pixel value. More specifically, the compression can replace a particular pixel value with a difference between a neighboring pixel value and the original pixel value. The compression can include lossy compression or lossless compression. Alternatively, the compression can change whole or a part of the pixel values of the compressed transmission data unit from their original values. Hereinafter, compression indicates a data processing method that can change at least one of pixel values of the corresponding transmission data unit.

Whether compressed data is used depends on an original data size and the compressed data size. The smaller of the original data and the compressed data would be used. Herein, the compressed data size can be determined after the compression or estimated based on the compression of a part of the original data.

Figure 4:
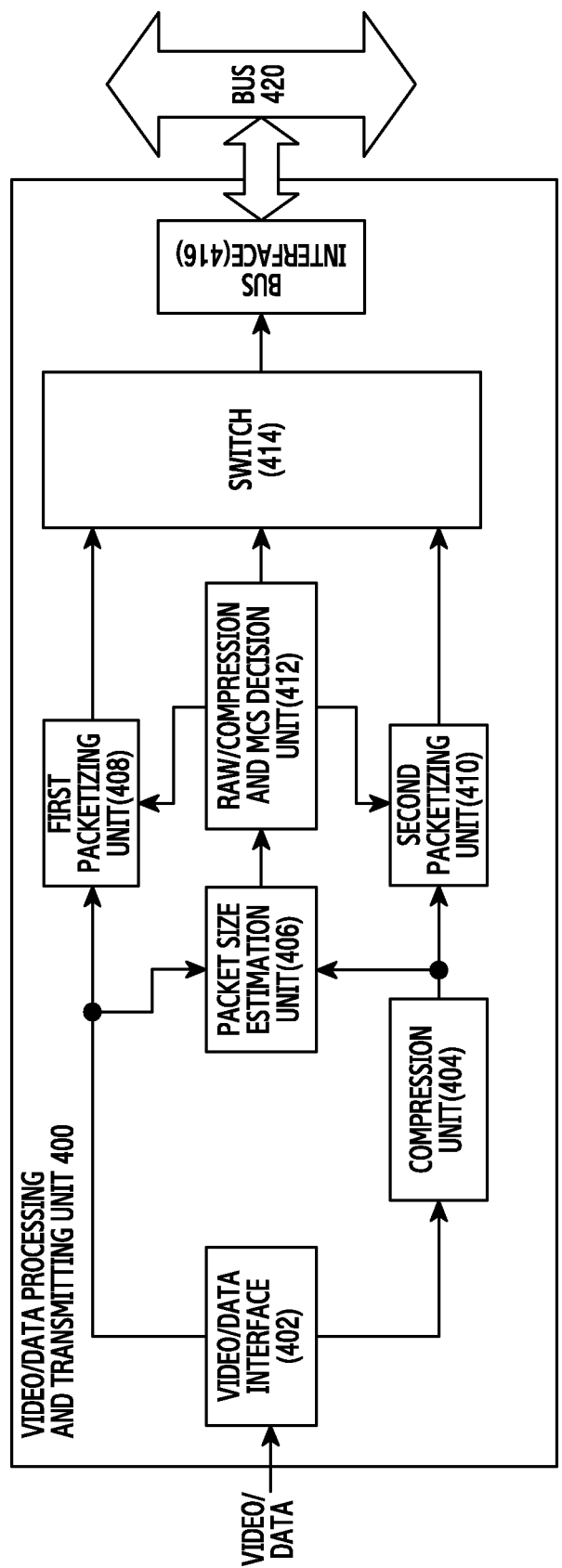
FIG. 4 illustrates function blocks for generating a video packet in a communication system according to an exemplary embodiment of the present disclosure.

FIG. 4 illustrates function blocks for generating a video packet in a communication system according to an exemplary embodiment of the present disclosure. FIG. 4 depicts generation of a video packet in a transmitting node.

Referring to FIG. 4, there is shown a video/data processing and transmitting unit 400 for generating a video packet, and includes a video/data interface 402, a compression unit 404, a packet size estimation unit 406, a first packetizing unit 408, a second packetizing unit 410, a raw/compression and Modulation and Coding Scheme (MCS) decision unit 412, a switch 414, and a bus interface 416.

The video/data interface 402 receives video data and control data from an external device. The video/data interface 402 extracts data from the received signal. When receiving the video data, the video/data interface 402 can change a color space of the video data from Red-Green-Blue (RGB) to YCbCr or vice versa. When control data is received, the video/data interface 402 may bypass the control data. In addition, the video/data interface 402 can segment the video data into the transmission data unit, that is, into a unit size for one video packet, and then provide the segmented data to the compression unit 404, the packet size estimation unit 406, and the first packetizing unit 408. For ease of understanding, the video data segmented for one video packet is referred to as a data block.

The compression unit 404 compresses the video data. In so doing, the compression unit 404 compresses the video data block, that is, the data of the unit size for one video packet. The compression can include lossy compression or lossless compression. Either the lossy compression or the lossless compression may be used according to setting of one or more parameters. A specific compression that may be used is a design and/or implementation decision.

The packet size estimation unit 406 estimates or measures the size of the compressed data block or the raw data block. Herein, the compressed data block is provided from the compression unit 404, and the raw data block is provided from the video/data interface 402. Generally, the compressed data block is smaller than the raw data block in size. However, in some cases, the compressed data block size can be greater than the raw data block. A specific size of the compressed data block can vary according to video source content.

The first packetizing unit 408 and the second packetizing unit 410 generate a packet that includes the data block. The first packetizing unit 408 adds a header to the raw data block, and the second packetizing unit 410 adds a header to the compressed data block. For example, the first packetizing unit 408 and the second packetizing unit 410 can include two separate First-In First-Out (FIFO) memories. The compressed data block fed to the second packetizing unit 410 is processed in the compression unit 404 while the data block fed to the first packetizing unit 408 does not undergo a similar processing. However, since the compression can be typically performed during few sample delays, latency can be quite short. When the data block is fed to the first packetizing unit 408 and the second packetizing unit 410, the packet size estimation unit 406 also receives the data block. Thus, the data block size estimation by the packet size estimation unit 406 can be performed and completed in a similar time to packet generation by the first packetizing unit 408 and the second packetizing unit 410.

The raw/compression and MCS decision unit 412 determines a packet to transmit based on the packet size. The raw/compression and MCS decision unit 412 determines the MCS, that is, a coding rate and a modulation order to be applied to the packet. An MCS index determined by the raw/compression and MCS decision unit 412 is provided to the first packetizing unit 408 and the second packetizing unit 410. The MCS index can be provided to other modules (e.g., a modem, a Communication Processor (CP), and so on) which encode and modulate the packet. The raw/compression and MCS decision unit 412 receives the compressed data block size and the raw data block size from the packet size estimation unit 406. Since the packet size estimation unit 406 estimates the size of the data blocks while the first packetizing unit 408 and the second packetizing unit 410 generate the packet, the compressed data block size and the raw data block size can be provided at a similar time to the packet generation completion.

The switch 414 outputs either the packet from the first packetizing unit 408 or the packet from the second packetizing unit 410 according to the determination of the raw/compression and MCS decision unit 412. That is, the switch 414 outputs either the packet including the raw data block or the packet including the compressed data block to the bus interface 416.

The bus interface 416 forwards the packet to the packet transmitting module (not shown) through the bus 420. The packet transmitting module can conduct Media Access Control (MAC) layer processing. The bus 420 may be, for example, one of an Advance High performance Bus (AHB) and an Advance Extensible Interface (AXI).

Figure 5:
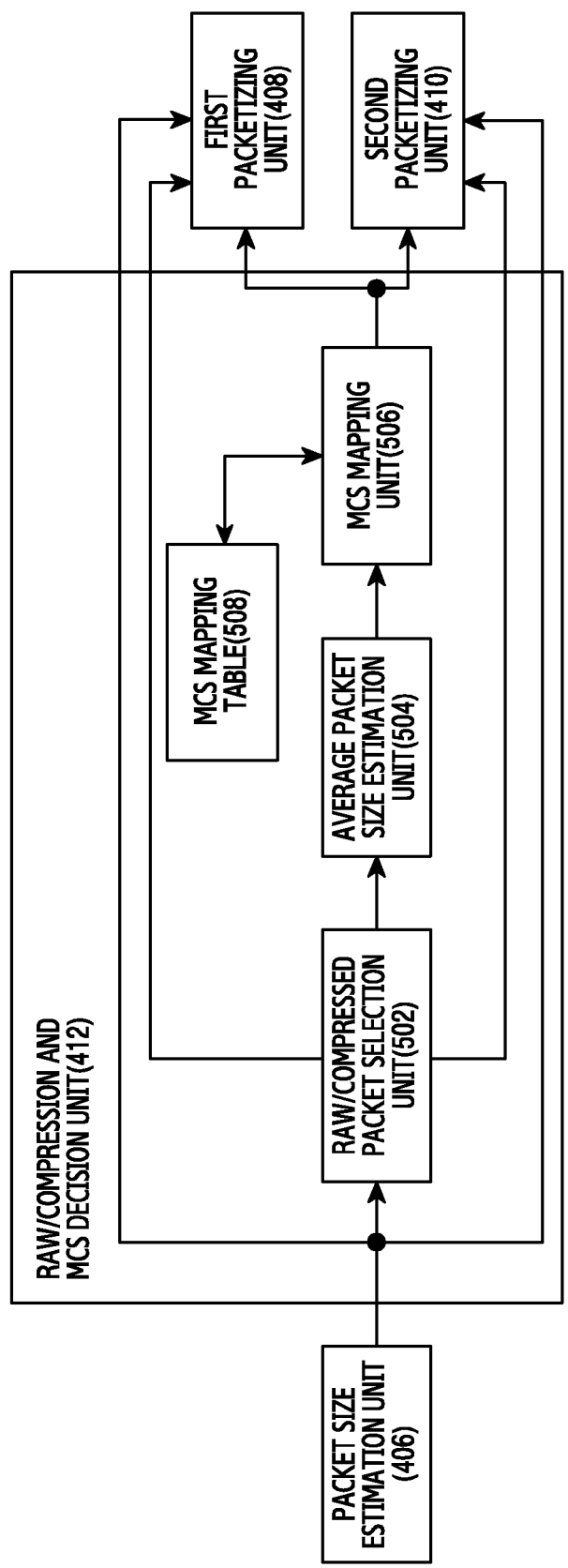
FIG. 5 illustrates function blocks for determining Modulation and Coding Scheme (MCS) in a communication system according to an exemplary embodiment of the present disclosure.

FIG. 5 illustrates function blocks for determining MCS, more specifically, the raw/compression and MCS decision unit 412, in a communication system according to an exemplary embodiment of the present disclosure.

Referring to FIG. 5, the raw/compression and MCS decision unit 412 includes a raw/compressed packet selection unit 502, an average packet size estimation unit 504, an MCS mapping unit 506, and an MCS mapping table 508.

The raw/compressed packet selection unit 502 selects the packet with the raw data block or the packet with the compressed data block. The raw/compressed packet selection unit 502 selects the packet to transmit based on the raw data block size and the compressed data block size provided from the packet size estimation unit 406. For example, when the compressed data block size is smaller, the raw/compressed packet selection unit 502 selects the packet with the compressed data block.

The average packet size estimation unit 504 calculates an average size of the transmit packets. More specifically, the average packet size estimation unit 504 can accumulate the size of a particular number of transmit packets, and estimate the average size of the packets already transferred to a system memory or the MAC layer. In so doing, the average packet size estimation unit 504 can utilize sliding window average estimation. The estimated average packet size is provided to the MCS mapping unit 506.

The MCS mapping unit 506 determines the MCS to be applied to the transmit packet. Accordingly, the MCS mapping unit 506 can search the MCS mapping table 508 for the appropriate MCS index corresponding to the average packet size. That is, the MCS mapping unit 506 selects an MCS index based on the average packet size. For example, the mapping of the MCS index and the average packet size can be defined to select a more robust coding rate and modulation order as the average packet size gets smaller. Hence, available resource utilization is maximized and the transmission can be made with high reliability. The selected MCS can be provided to the first packetizing unit 408 and the second packetizing unit 410. The first packetizing unit 408 and the second packetizing unit 410 may insert the packet size, the MCS index, and a raw/compression indicator to the header.

Figure 6A:
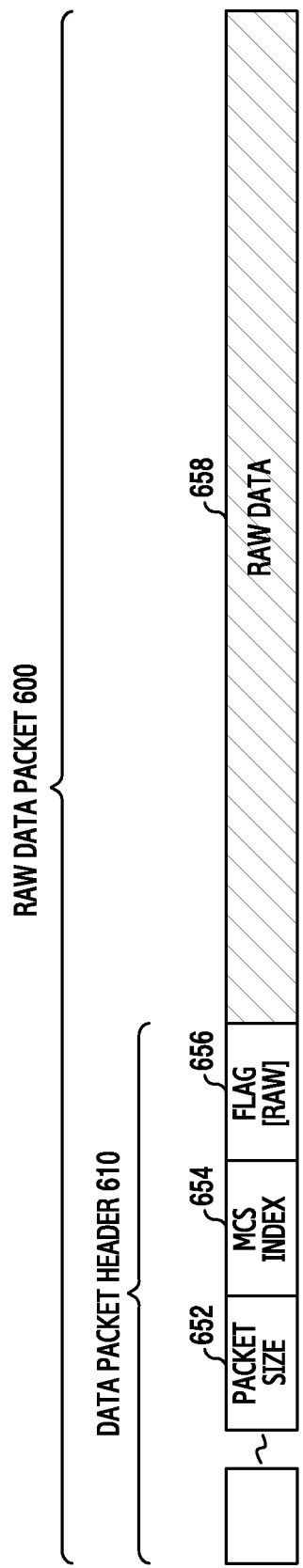
FIGS. 6A and 6B illustrate a video packet in a communication system according to an exemplary embodiment of the present disclosure.
Figure 6B:
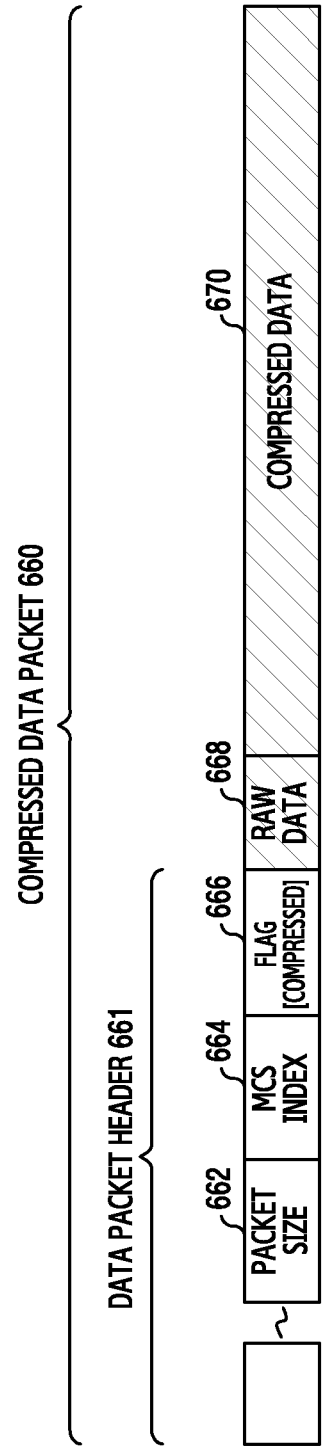

FIGS. 6A and 6B illustrate a video packet in a communication system according to an exemplary embodiment of the present disclosure. FIG. 6A depicts a packet 600 with a raw data block, and FIG. 6B depicts a packet 660 with a compressed data block.

Referring to FIG. 6A, the raw data packet 600 includes a data packet header 610 including a packet size 652, an MCS index 654, a flag 656, and raw data 658. The packet size 652 may indicate the size of the raw data packet 600 or the size of the raw data 658, depending on a protocol used. The MCS index 654 may indicate the MCS level selected based on the average size of the packets. The flag 656 may indicate whether the data block of the raw data packet 600 is raw data or compressed data. In FIG. 6A, the flag 656 would indicate 'raw' data. The raw data 658 includes the raw data block segmented as the transmission data unit. At least one of the packet size 652 and the MCS index 654 may be omitted according to some embodiments of the present disclosure.

Referring to FIG. 6B, the compressed data packet 660 includes a data packet header 661 including a packet size 662, an MCS index 664, and a flag 666, raw data 668, and compressed data 670. The packet size 664 may indicate the size of the compressed data packet 660 or the size of the raw data 668 and the compressed data 670, depending on a protocol used. The MCS index 664 may indicate the MCS level selected based on the average size of the packets. The flag 666 indicates whether the data block of the packet is the raw data or the compressed data. In FIG. 6B, the flag 666 would indicate 'compressed' data. At least one of the packet size 662 and the MCS index 664 may be omitted according to some embodiments of the present disclosure. The raw data 668 is included as a reference pixel value for the compression of the compressed data 670.

In FIG. 6B, the compression changes only a part of pixel values of the data block. Accordingly, a part of pixel values are transmitted as the compressed data 670, and the other pixel values are transmitted as the raw data 668. For example, the raw data 668 can include the corresponding original pixel values, and the compressed data 670 can include a difference value between the corresponding pixel and the neighboring pixel. At least one pixel value in the raw data 668 is the reference pixel value for the compression. Accordingly, at least one pixel value in the raw data 668 is used as the reference pixel value for decompression. For example, the raw data 668 may include only one pixel value.

The compressed data block in FIG. 6B includes the raw data 668 as a reference pixel value. According to another exemplary embodiment of the present disclosure, the raw data 668 can be excluded. In that case, the reference pixel value for the compressed data 668 can be predefined and a receiving node sets the reference pixel value to the predefined value.

Figure 7:
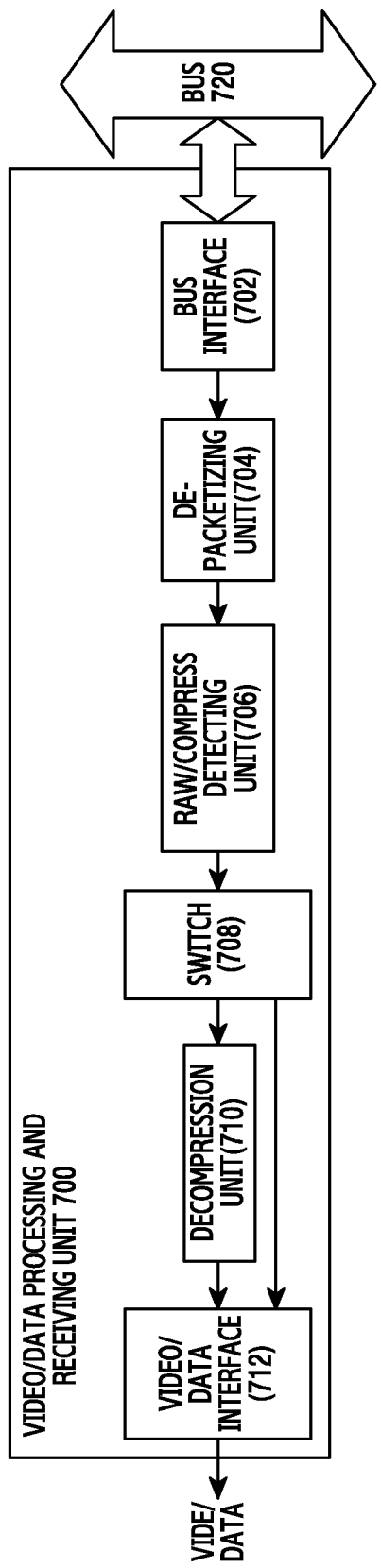
FIG. 7 illustrates function blocks for parsing a video packet in a communication system according to an exemplary embodiment of the present disclosure.

FIG. 7 illustrates function blocks for parsing a video packet in a communication system according to an exemplary embodiment of the present disclosure. FIG. 7 depicts a means for parsing a packet in the receiving node.

Referring to FIG. 7, the video/data processing and receiving unit 700 for parsing the video packet includes a bus interface 702, a de-packetizing unit 704, a raw/compress detecting unit 706, a switch 708, a decompression unit 710, and a video/data interface 712.

The bus interface 702 receives a packet input through a bus 720. The bus 720 may be, for example, one of AHB or AXI.

The de-packetizing unit 704 splits the packet into the header and the data described with respect to FIGS. 6A and 6B. The data can be referred to as payload. The de-packetizing unit 704 parses the header and extracts information for determining a packet type from the header. Herein, the packet type indicates whether the packet is the video data packet.

The raw/compress detecting unit 706 determines whether the payload is a compressed data block or a raw data block. For example, based on the packet header, the raw/compress detecting unit 706 can determine whether the payload is the compressed data block or not.

The switch 708 provides the payload partitioned from the received packet to the decompression unit 710 or the video/data interface 712 according to whether the payload needs to be decompressed. For example, when the flag of the packet header indicates raw data block, the switch 708 provides the data to the video/data interface 712. Alternatively, when the flag of the packet header indicates compressed data block, the switch 708 provides the data to the decompression unit 710.

The decompression unit 710 generates the raw data by decompressing the data partitioned from the payload. That is, the decompression unit 710 converts the compressed data block to raw data block. In so doing the decompression unit 710 decompresses the data according to the compression method of the transmitting node.

The video/data interface 712 provides the video data to an external device or other module for processing the video data. In addition, the video/data interface 712 may perform RGB-YCbCr conversion or YCbCr-RGB conversion. Further, the video/data interface 712 may perform video subsampling. The video/data interface 712 may also process vertical synchronization, horizontal synchronization, data enable, and interlace control signal.

Figure 8:
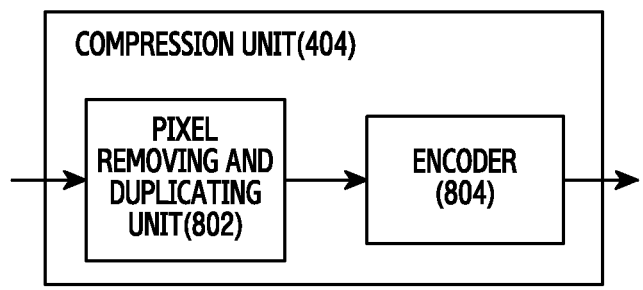
FIG. 8 illustrates function blocks for compressing video data in a communication system according to an exemplary embodiment of the present disclosure.

FIG. 8 illustrates function blocks for compressing video data in a communication system according to an exemplary embodiment of the present disclosure. FIG. 8 depicts a detailed structure of the compression unit 404 of the transmitting node.

The compression unit 404 includes a pixel removing and duplicating unit 802 and an encoder 804.

The pixel removing and duplicating unit 802 removes a part of lower values of the pixel values and replaces them with a corresponding lower value of a neighboring pixel. For example, when the video uses the YCbCr color space, the pixel removing and duplicating unit 802 can remove a lower part of the Cb value and the Cr value of other pixels than one of a certain number of neighboring pixels, and replace the removed Cb and Cr values with corresponding Cb and Cr values of the one pixel. Pre-processing of the pixel removing and duplicating unit 802 can enhance the video data compression rate. The pixel removing and duplicating unit 802 can be implemented using, for example, small-sized extra hardware or digital logic gates.

The encoder 804 compresses the data according to a rule defined by the compression method. For example, the encoder 804 can change at least one pixel value with the difference value of the reference pixel value. Bits for representing the difference value can vary according to the size of the difference value. To distinguish boundaries of different bit values, the values can be arranged or converted according to a specific rule. When the pixel removing and duplicating unit 802 makes the lower value of a part of pixels the same, the corresponding lower values are identical among the neighboring pixels. Thus, the difference values of the part of pixels can be represented using one bit.

In FIG. 8, some pixel values can be lost. In this case, the combination of the pixel removing and duplicating unit 802 and the encoder 804 can result in video quality degradation in the compression. Hence, the pixel removing and duplicating unit 802 may be omitted according to design and/or implementation decisions.

Figure 9A:
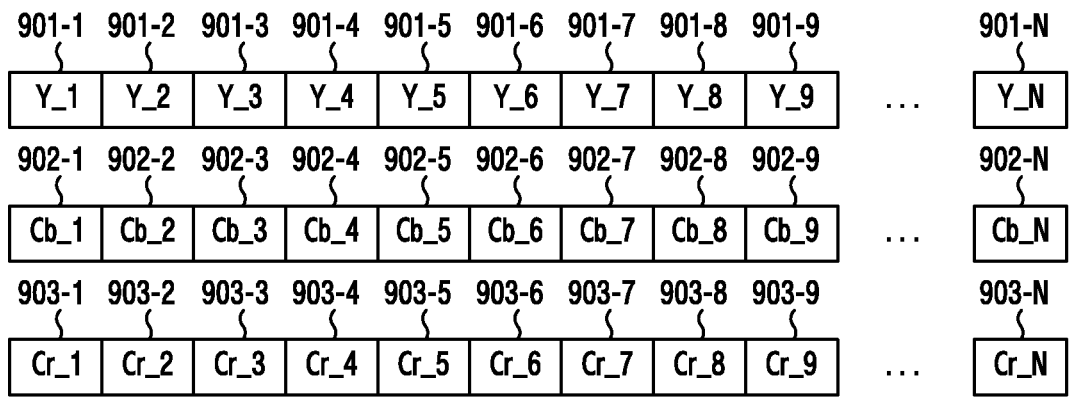
FIGS. 9A, 9B, and 9C illustrate video frame compression in a communication system according to an exemplary embodiment of the present disclosure.
Figure 9B:
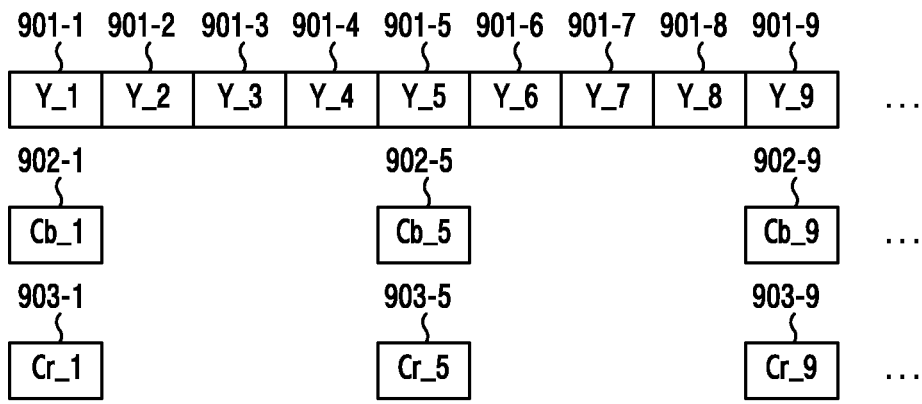
Figure 9C:
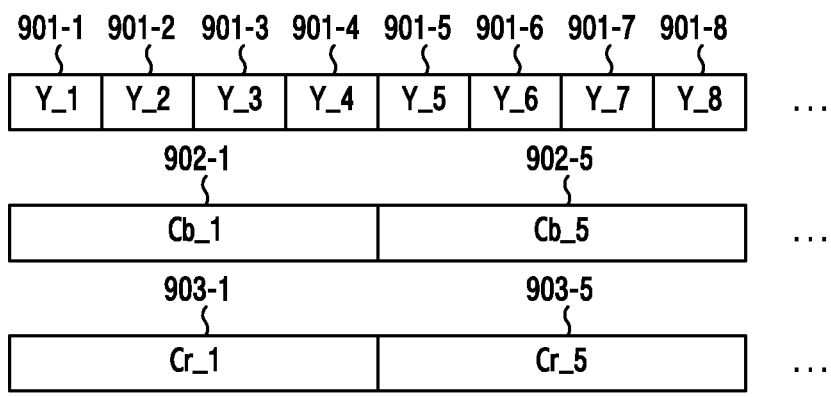

FIGS. 9A, 9B, and 9C illustrate video frame compression in a communication system according to an exemplary embodiment of the present disclosure. FIGS. 9A, 9B, and 9C depict pixel value processing of the pixel removing and duplicating unit 802 of FIG. 8.

Referring to FIG. 9A, N-ary pixels are represented in the YCbCr color space. The YCbCr represents the pixel value using luminance and chrominance. The pixel values can be divided into luminance values 901-1 through 901-N, first chrominance values 902-1 through 902-N, and second chrominance values 903-1 through 903-N.

Referring to FIG. 9B, a part of the first chrominance values 902-1 through 902-N and a part of the second chrominance values 903-1 through 903-N are removed. For example, as shown in FIG. 9B, other values than those shown can be removed. In other words, a part of the first chrominance values 902-1 through 902-N and a part of the second chrominance values 903-1 through 903-N can be selected at a sampling rate other than 4. The luminance values 901-1 through 901-N are maintained. This is because human eye is sensitive to luminance change.

Referring to FIG. 9C, the removed first chrominance values 902-2, 902-3, 902-4, . . . are replaced by the sampled first chrominance value 902-1 of the previous index. That is, the sampled first chrominance value 902-1 is duplicated at the removed location. The removed second chrominance values 903-2, 903-3, 903-4, . . . are replaced by the sampled second chrominance value 903-1 of the previous index. That is, the sampled second chrominance value 903-1 is duplicated at the removed location.

Figure 10:
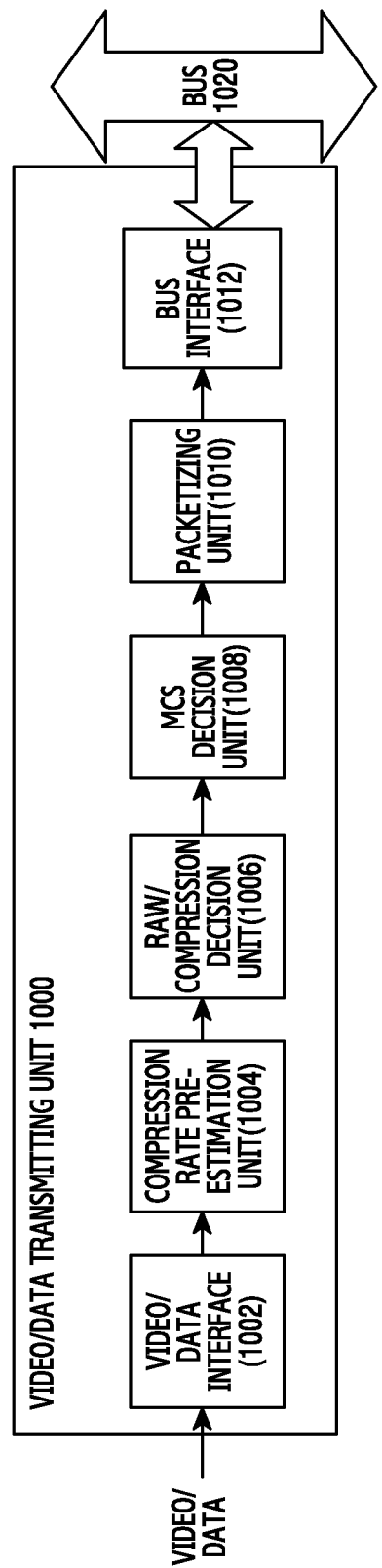
FIG. 10 illustrates function blocks for generating a video packet in a communication system according to another exemplary embodiment of the present disclosure.

FIG. 10 illustrates function blocks for generating a video packet in a communication system according to another exemplary embodiment of the present disclosure. FIG. 10 depicts a means for generating the video packet in the transmitting node. Unlike FIG. 4, the blocks of FIG. 10 predict the compressed size of the data block prior to the compression and then selects the data block to transmit.

Referring to FIG. 10, generation of a video packet by a video/data transmitting unit 1000 may include functions performed by a video/data interface 1002, a compression rate pre-estimation unit 1004, a raw/compression decision unit 1006, an MCS decision unit 1008, a packetizing unit 1010, and a bus interface 1012.

The video/data interface 1002 receives video data and control data from an external device (not shown). The video/data interface 1002 extracts data from the received signal. When receiving the video data, the video/data interface 1002 can change the color space of the video data from RGB to YCbCr or vice versa. In addition, the video/data interface 1002 can segment the video data into a data block unit as explained earlier.

The compression rate pre-estimation unit 1004 generates a prediction value for the compressed size of the data block. That is, the compression rate pre-estimation unit 1004 determines a prediction value of the compressed data block size. For example, the compression rate pre-estimation unit 1004 can estimate the compressed size using a pattern of the pixel values. More specifically, the compression rate pre-estimation unit 1004 can compress a part of pixels of the data block and then estimate the compressed size of the whole data blocks based on the compressed size of the part of pixels. In some embodiments of the disclosure, the compression rate pre-estimation unit 1004 can estimate the compressed size of the data block by multiplying the compressed size of pixels of 1/n of the data block by n.

The raw/compression decision unit 1006 determines whether to compress the data block based on the prediction value of the compressed data block size. That is, when the prediction value is smaller than the raw data block size, the raw/compression decision unit 1006 determines to compress the data block. Next, the raw/compression decision unit 1006 compresses the data block. Herein, the compression can adopt lossy compression or lossless compression. One of lossy compression and lossless compression can be used according to the settings for operation of the compression process.

The MCS decision unit 1008 determines the MCS, that is, the coding rate and the modulation order, to be applied to the data block. The MCS decision unit 1008 can determine the MCS based on the packet size or the average size of the packet and the packets already transmitted. More specifically, the MCS decision unit 1008 can estimate the average size of a specific number of transmitted packets, and determine the MCS index corresponding to the average size. Accordingly, the MCS decision unit 1008 may include an MCS mapping table or use an MCS table stored in another module. The MCS mapping table may be defined, for example, to select a more robust coding rate and modulation order as the average packet size gets smaller. The MCS index determined by the MCS decision unit 1008 is provided to the packetizing unit 1010. The MCS index can be provided to other modules (e.g., a modem, a CP, and so on) for encoding and modulating the packet.

The packetizing unit 1010 generates the packet including the data block. Herein, the data block includes either the raw data block or the compressed data block. The packetizing unit 1010 packetizes the data by adding a header to the data block from the raw/compression decision unit 1006 that may include, for example, at least one of the packet size, the MCS index, and the flag for indicating whether the contained data is raw data or compressed data.

The bus interface 1012 forwards the packet to the packet transmitting module through a bus 1020. The packet transmitting module may be able to perform, for example, MAC layer processing. The bus 1020 may be, for example, one of AHB or AXI.

Figure 11:
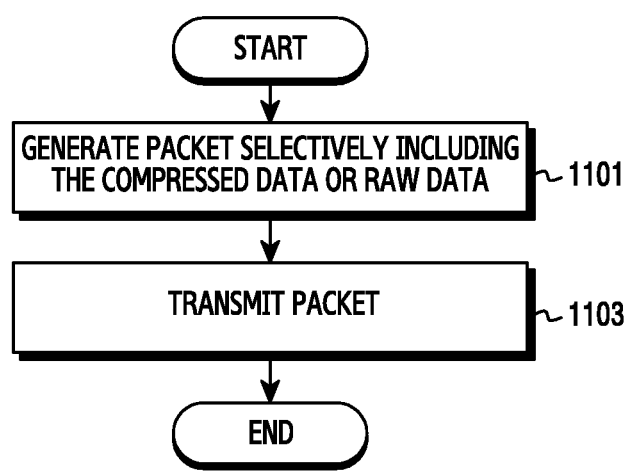
FIG. 11 illustrates an operation of a transmitting node in a communication system according to an exemplary embodiment of the present disclosure.

FIG. 11 illustrates an operation of a transmitting node in a communication system according to an exemplary embodiment of the present disclosure. FIG. 11 depicts a method for transmitting a video packet.

Referring to FIG. 11, the transmitting node generates the packet which selectively includes the compressed data or the raw data in operation 1101. The data is video content and includes a part of pixel values partitioned from one frame as the transmission data unit. The transmitting node can select the data to be contained in the packet by comparing the compressed data size with the raw data size. The transmitting node generates the packet by adding the header to the selected data. The header can include at least one of the packet size, the MCS index, and the flag for indicating whether the contained data is raw data or compressed data. The MCS index can indicate the MCS level determined based on the average size of the packet and at least one packet previously transmitted, or the average size of at least one packet previously transmitted. The compressed data can include raw data of at least one pixel used as the reference pixel for the compression.

In operation 1103, the transmitting node transmits the packet. The packet can be transmitted over a wired or wireless channel. More specifically, the transmitting node can encode and modulate the packet, convert the packet to an analog signal, and then transmit the analog signal. In so doing, the transmitting node can determine the MCS level for the encoding and the modulation. The MCS level can differ from the MCS level determined based on the average packet size. That is, the MCS level determined based on the average packet size is recommendation determined in the video packet generation, and a final MCS level can be determined by further considering a channel condition.

Figure 12:
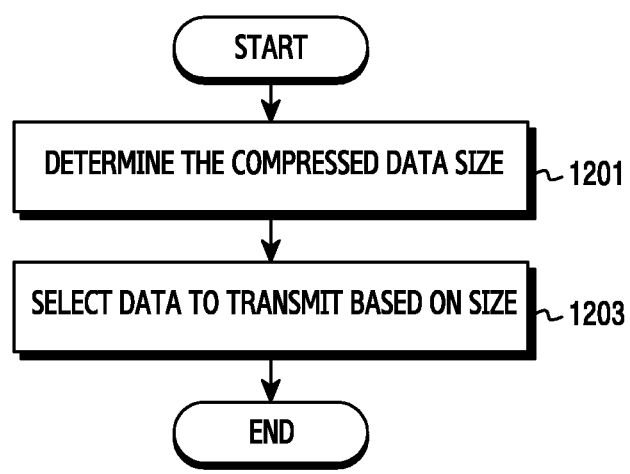
FIG. 12 illustrates an operation of a transmitting node in a communication system according to another exemplary embodiment of the present disclosure.

FIG. 12 illustrates an operation of a transmitting node in a communication system according to another exemplary embodiment of the present disclosure. FIG. 12 depicts a method for selecting data to be included in the packet.

Referring to FIG. 12, the transmitting node determines the compressed data size in operation 1201. The data is video content and includes a part of pixel values from one frame partitioned as the transmission data unit. The transmitting node can compress the data and then measure the data size. Alternatively, the transmitting node can compress part of the data and then estimate the whole compressed data size based on the size of the compressed data.

In operation 1203, the transmitting node selects data to transmit based on size. That is, the transmitting node selects either the compressed data or the raw data for transmission based on the compressed data size. More specifically, the transmitting node compares the original data size with the compressed data size, and selects the raw data when the original raw data size is smaller, and selects the compressed data when the compressed data size is smaller.

Figure 13:
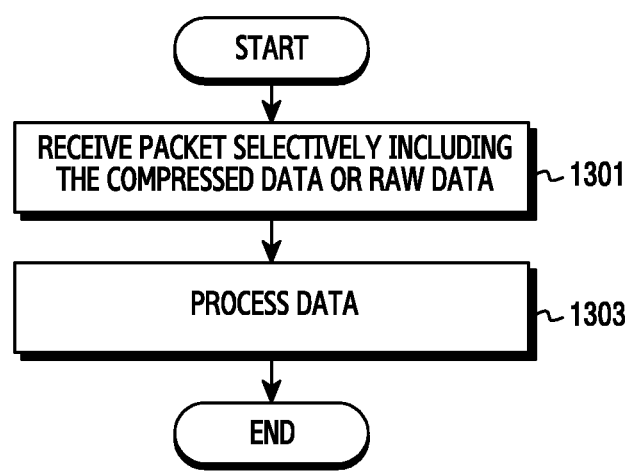
FIG. 13 illustrates an operation of a receiving node in a communication system according to another exemplary embodiment of the present disclosure.

FIG. 13 illustrates an operation of a receiving node in a communication system according to another exemplary embodiment of the present disclosure. FIG. 13 depicts a method for receiving a video packet.

Referring to FIG. 13, the receiving node receives the packet which includes the compressed data or the raw data in operation 1301. The data is video content and includes a part of pixel values partitioned from one frame as the transmission data unit. The packet includes the header and either the compressed data or the raw data. The header can include at least one of the packet size, the MCS index, and the flag for indicating whether the contained data is the raw data or the compressed data.

In operation 1303, the receiving node processes the data in the packet. The data is either the compressed data or the raw data. The receiving node processes the data based on whether the data of the packet is compressed or not. The receiving node determines whether the data is the raw data or the compressed data. The receiving node can determine whether it is compressed data or the raw data based on the data type flag of the header. For the compressed data, the receiving node restores the raw data by decompressing the data extracted from the packet. The compressed data can include raw data of at least one pixel used as the compression reference pixel. The receiving node can decompress the data based on the at least one pixel value. According to yet another exemplary embodiment of the present disclosure, the compressed data may not include the raw data of the at least one pixel used as the compression reference pixel. In this case, the receiving node can set the reference pixel value to a predefined value and then decompress the data based on the predefined value.

Figure 14:
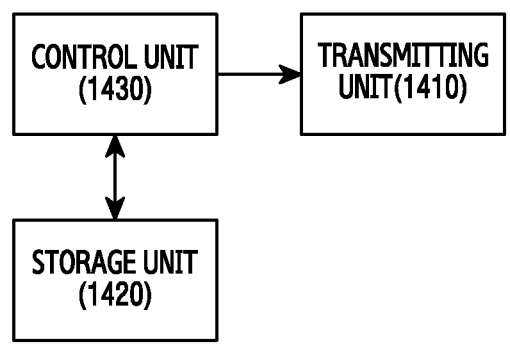
FIG. 14 illustrates a transmitting node in a communication system according to an exemplary embodiment of the present disclosure.

FIG. 14 is a block diagram of a transmitting node in a communication system according to an exemplary embodiment of the present disclosure.

Referring to FIG. 14, the transmitting node includes a transmitting unit 1410, a storage unit 1420, and a control unit 1430.

The transmitting unit 1410 is configured to transmit a signal. For example, the transmitting unit 1410 can encode, modulate, band-convert, and amplify the signal. For example, the transmitting unit 1410 can include at least one of a modem, a transmit filter, an amplifier, a mixer, an oscillator, and a Digital to Analog Converter (DAC). Accordingly, the transmitting unit 1410 may be able to transmit the video packet fed from the control unit 1430 to a receiving node. The transmitting unit 1410 can determine the final MCS level for the packet based on the MCS level selected based on the average packet size provided from the control unit 1430. The transmitting unit 1410 can be referred to as a communication unit.

The storage unit 1420 stores a program for the operation of the transmitting node, and may store an application program and data such as setting information for the transmission. For example, the storage unit 1420 can store a table that defines the mapping between the average packet size and the MCS level. According to another exemplary embodiment of the present disclosure, the table can be stored in the control unit 1430 or still another module. The storage unit 1420 provides the stored data according to a request of the control unit 1430.

The control unit 1430 controls the operation of the transmitting node. For example, the control unit 1430 transmits the signal through the transmitting unit 1410. The control unit 1430 records and reads data to and from the storage unit 1420. Accordingly, the control unit 1430 can include at least one processor. For example, the control unit 1430 can include at least one of a CP for controlling communication and an Application Processor (AP) for controlling a higher layer such as application program. The control unit 1430 includes at least one processor for realizing at least one of the function units of FIGS. 4, 5, 8, and 10. The control unit 1430 can control the transmitting node to execute the methods of FIGS. 11 and 12. The control unit 1430 may operate as described below.

According to an exemplary embodiment of the present disclosure, the control unit 1430 generates the packet that selectively includes the compressed data or the raw data. In detail, the control unit 1430 selects the data to be contained in the packet by comparing the compressed data size with the raw data size, and generates the packet by adding the header to the selected data. The header can include at least one of the packet size, the MCS index, and the flag for indicating whether the contained data is the raw data or the compressed data. The control unit 1430 transmits the packet through the transmitting unit 1410.

According to another exemplary embodiment of the present disclosure, the control unit 1430 determines the compressed data size. The control unit 1430 can compress the data and then determine the compressed data size. Alternatively, the control unit 1430 can compress part of the data and then estimate the whole data size compressed based on the partial size of the compressed data. The control unit 1430 selects either the compressed data or the raw data to transmit, based on the compressed data size. More specifically, the control unit 1430 compares the original data size with the compressed data size, selects the raw data when the original data size is smaller, and selects the compressed data when the compressed data size is smaller.

Figure 15:
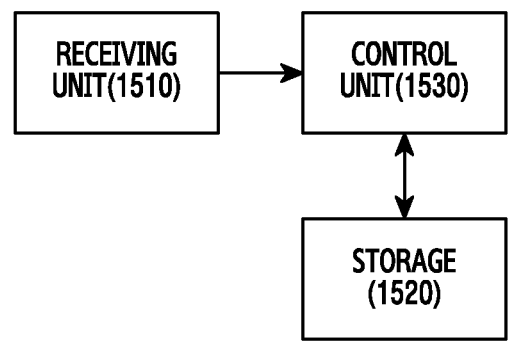
FIG. 15 illustrates a receiving node in a communication system according to an exemplary embodiment of the present disclosure.

FIG. 15 is a block diagram of a receiving node in a communication system according to an exemplary embodiment of the present disclosure.

Referring to FIG. 15, the receiving node includes a receiving unit 1510, a storage unit 1520, and a control unit 1530.

The receiving unit 1510 may be configured to receive a signal. For example, the receiving unit 1510 can amplify, band-convert, demodulate, and decode the signal. For example, the receiving unit 1510 can include at least one of a receive filter, an amplifier, a mixer, an oscillator, an Analog to digital Converter (ADC), and a modem. The receiving unit 1510 acquires the video packet by demodulating and decoding the received signal, and provides the video packet to the control unit 1530. The receiving unit 1510 can be referred to as a communication unit.

The storage unit 1520 stores a default program for the operation of the receiving node, an application program, and data such as setting information. The storage unit 1520 provides the stored data according to a request of the control unit 1530.

The control unit 1530 controls the operation of the receiving node. For example, the control unit 1530 receives the signal through the receiving unit 1510. The control unit 1530 records and reads data to and from the storage unit 1520. For doing so, the control unit 1530 can include at least one processor. For example, the control unit 1530 can include at least one of a CP for controlling communication and an AP for controlling a higher layer such as application program. The control unit 1530 includes at least one processor for realizing at least one of the function units of FIG. 7. The control unit 1530 can control the receiving node to perform the methods of FIG. 13. The control unit 1530 operates as below.

The control unit 1530 receives through the receiving unit 1510 a packet that includes compressed data or raw data. The packet header can include at least one of the packet size, the MCS index, and the flag for indicating whether the data is the raw data or the compressed data. Based on the indicator of the header, the control unit 1530 can determine whether the compressed data or the raw data is contained in the packet. For the compressed data, the control unit 1530 restores the raw data by decompressing the data extracted from the packet. When the compressed data includes raw data of at least one pixel used as the compression reference pixel, the control unit 1530 can decompress the data based on the at least one pixel value. When the compressed data does not include the raw data of the at least one pixel used as the compression reference pixel, the control unit 1530 can set the reference pixel value to the predefined value and then decompress the data based on the predefined value.

Without substantial video quality degradation, the MCS index can be reduced by 4 through 5 levels on average. For example, when the MCS index required in raw video stream transmission without the compression is 8, the transmitting node can use the MCS index of 3 through 4. To process the video stream or the data stream with low hardware complexity, it is advantageous to process the packet in real time. Table 1 and Table 2 show the MCS indexes of the present method and only the raw data transmission in simulations.

TABLE 1

| Transmission scheme | MCS index |
| --- | --- |
| transmitting only raw data | 8 (all of time period) |
| Selectively transmitting raw data or compressed data | 3 (60% of time period) |
| | 4 (35 of time period) |
| | 2, 5, 6, 7 or 8 (5% of time period) |

Table 1 shows MCS index observation results with the lossless compression.

TABLE 2

| Transmission scheme | MCS index |
| --- | --- |
| transmitting only raw data | 8 (all of time period) |
| Selectively transmitting raw data or compressed data | 2 (70% of time period) |
| | 3 (25% of time period) |
| | 1, 4, 5, 6, 7 or 8 (5% of time period) |

Table 2 shows MCS index observation results with the lossy compression. Table 2 shows simulation results when a part of pixel values are removed and duplicated as shown in FIG. 9. In the simulations, the sampling rate is set to 2.

One compression method is considered in various exemplary embodiments of the present disclosure. According to various exemplary embodiments of the present disclosure, raw data and a plurality of compressed data units generated using a plurality of different compression schemes can be considered. For example, a process of FIG. 16 can be used.

Figure 16:
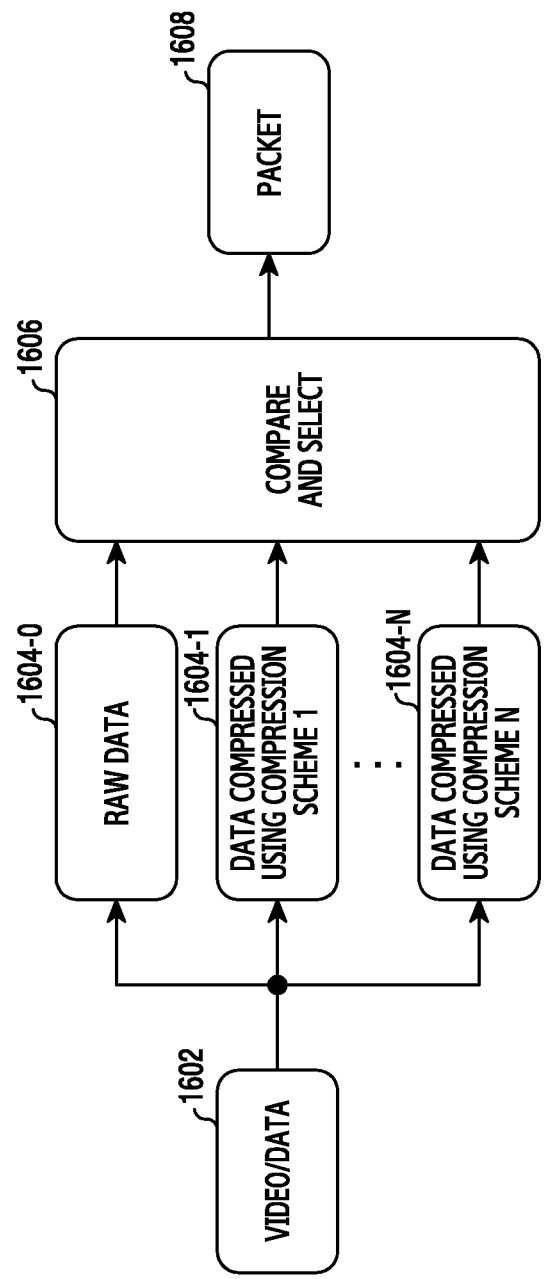
FIG. 16 illustrates packet generation using multiple compression schemes according to an exemplary embodiment of the present disclosure.

FIG. 16 illustrates packet generation using multiple compression schemes according to an exemplary embodiment of the present disclosure. Referring to FIG. 16, video/data 1602 may be used to generate a plurality of data 1604-1 through 1604-N that are compressed using different compression schemes. The plurality of data 1604-1 through 1604-N and the raw data 1604-0 may be compared in the compare and select operation 1606. For example, when all of the data 1604-1 through 1604-N are greater in size than the raw data 1604-0, the raw data 1604-0 can be transmitted. In so doing, a header of a packet 1608 can include information indicating the raw data. By contrast, when any one of the compressed data units 1604-1 through 1604-N is smaller than the raw data 1604-0 in size, the smallest compressed data can be transmitted. This process can be applied to both of the video and the data. Since the compression efficiency can differ per compression scheme according to the data characteristics, an average compression rate can be enhanced. To this end, the transmitting node can operate as shown in FIG. 17.

Figure 17:
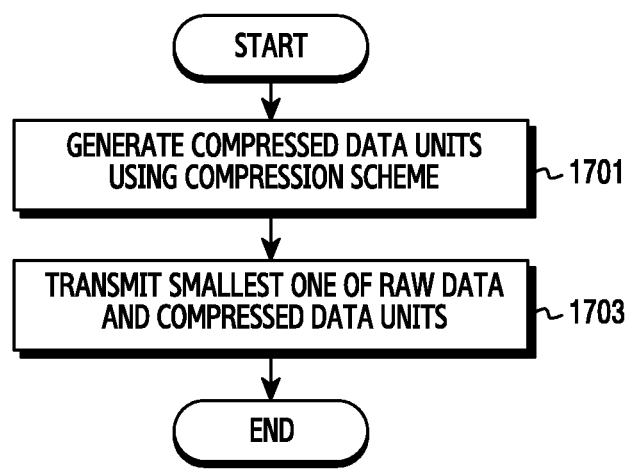
FIG. 17 illustrates an operation of a transmitting node using multiple compression schemes according to an exemplary embodiment of the present disclosure.

FIG. 17 illustrates an operation of a transmitting node using multiple compression schemes according to an exemplary embodiment of the present disclosure. In FIG. 17, a video packet is transmitted.

Referring to FIG. 17, the transmitting node generates a plurality of compressed data units using a plurality of compression schemes in operation 1701. That is, the transmitting node can generate the compressed data units by compressing video or data in parallel. Herein, the compression schemes can include different compression schemes and the same compression scheme using different setting values.

In operation 1703, the transmitting node transmits the smallest of the raw data and the compressed data units. The transmitting node can generate a packet including the selected data. The packet header may include information for indicating whether the included data is raw data or compressed data. The header can further include information for indicating the compression scheme applied to the data.

As set forth above, the transmitted data size can be reduced by comparing data sizes before and after the compression.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While various embodiments have been shown and described with reference to this disclosure and the accompanying drawings, it will be understood by those skilled in the art that various changes in form and details may be made to the various embodiments without departing from the spirit and scope of the disclosure and the appended claims and their equivalents.

What is claimed is:

1. A method for operating a transmitting node in a communication system, the method comprising:
    performing a compression on a 1/n part of raw data;
    estimating a compressed size of the raw data by multiplying n to a compressed size of the 1/n part of the raw data;
    when the estimated compressed size of the raw data is greater than or equal to a size of the raw data, generating a packet comprising the raw data and a header comprising an index indicating a modulation and coding scheme (MCS) level to be applied to the packet;
    when the estimated compressed size of the raw data is smaller than the size of the raw data, performing a compression on the raw data and generating the packet comprising the compressed raw data and the header comprising the MCS level to be applied to the packet;
    determining the MCS level based on an average size of the packet, wherein the average size of the packet is determined by using a sliding window average estimation that estimates an average size of a predetermined number of packets; and
    transmitting the generated packet to a receiving node.

2. The method of claim 1, wherein the compression on the raw data is performed by maintaining luminance values and sampling a first chrominance value and a second chrominance value with predetermined sampling rate.

3. The method of claim 1, wherein the packet further comprises a flag indicating whether the packet comprises the raw data or the compressed raw data.

4. A method for operating a receiving node in a communication system, the method comprising:
    receiving, from a transmitting node, a packet comprising a header and one of raw data or compressed raw data, wherein the header comprises an indicator indicating whether the packet comprises the raw data or the compressed raw data, wherein the compressed raw data is generated by performing a compression on the raw data;
    determining whether the packet comprises the raw data or the compressed raw data based on the indicator, and
    decompressing the packet when the packet is determined to comprise the compressed raw data,
    wherein the packet comprises the raw data when an estimated compressed size of the raw data is equal to or greater than a size of the raw data,
    wherein the packet comprises the compressed raw data when the estimated compressed size of the raw data is smaller than the size of the raw data,
    wherein the estimated compressed size of the raw data is estimated by multiplying n to a compressed size of a 1/n part of the raw data,
    wherein the header further comprises a modulation and coding scheme (MCS) level to be applied to the packet,
    wherein the MCS level is determined based on an average size of the packet, and
    wherein the average size of the packet is determined by using a sliding window average estimation that estimates an average size of a predetermined number of packets.

5. The method of claim 4, wherein the compression on the raw data is performed by maintaining luminance values and sampling a first chrominance value and a second chrominance value with predetermined sampling rate.

6. An apparatus of a transmitting node in a communication system, the apparatus comprising:
    a transceiver, and
    at least one processor configured to:
        perform a compression on a 1/n part of raw data;
        estimate a compressed size of the raw data by multiplying n to a compressed size of the 1/n part of the raw data;
        when the estimated compressed size of the raw data is greater than or equal to a size of the raw data, generate a packet comprising the raw data and a header comprising an index indicating a modulation and coding scheme (MCS) level to be applied to the packet;

when the estimated compressed size of the raw data is smaller than the size of the raw data, perform a compression on the raw data and generate the packet comprising the compressed raw data and the header comprising the MCS level to be applied to the packet;

determine the MCS level based on an average size of the packet, wherein the average size of the packet is determined by using a sliding window average estimation that estimates an average size of a predetermined number of packets; and control the transceiver to transmit the generated packet to a receiving node.

7. The apparatus of claim 6, wherein the at least one processor is further configured to perform the compression on the raw data by maintaining luminance values and sampling a first chrominance value and a second chrominance value with predetermined sampling rate.

8. The apparatus of claim 6, wherein the packet further comprises a flag indicating whether the packet comprises the raw data or the compressed raw data.

9. An apparatus of a receiving node in a communication system, the apparatus comprising:

a transceiver; and at least one processor configured to:

control the transceiver to receive, from a transmitting node, a packet comprising a header and one of raw data or compressed raw data, wherein the header comprises an indicator indicating whether the packet comprises the raw data or the compressed raw data, wherein the compressed raw data is generated by performing a compression on the raw data;

determine whether the packet comprises the raw data or the compressed raw data based on the indicator, and decompress the packet when the packet is determined to comprise the compressed raw data, wherein the packet comprises the raw data, when an estimated compressed size of the raw data is equal to or greater than a size of the raw data, wherein the packet comprises the compressed raw data when the estimated compressed size of the raw data is smaller than the size of the raw data, wherein the estimated compressed size of the raw data is estimated by multiplying n to a compressed size of a 1/n part of the raw data, wherein the header further comprises a modulation and coding scheme (MCS) level to be applied to the packet, wherein the MCS level is determined based on an average size of the packet, and wherein the average size of the packet is determined by using a sliding window average estimation that estimates an average size of a predetermined number of packets.

10. The apparatus of claim 9, wherein the header further comprises an index indicating the MCS level.

11. The apparatus of claim 9, wherein the compression on the raw data is performed by maintaining luminance values and sampling a first chrominance value and a second chrominance value with predetermined sampling rate.

* * * * *